United States Patent [19]

Stefanov

[11] Patent Number: 5,075,672
[45] Date of Patent: Dec. 24, 1991

[54] SYSTEM FOR DETECTING THE CONDITION OF A LAMP AND ACTIVATING A PERMANENT MEMORY TWO-STATE DISPLAY OF THE LAMP CONDITION

[75] Inventor: Boris Stefanov, Los Angeles, Calif.

[73] Assignee: Ambartsum S. Pashinian, Eagle Rock, Calif.

[21] Appl. No.: 544,838

[22] Filed: Jun. 27, 1990

[51] Int. Cl.⁵ .............................................. G08B 21/00
[52] U.S. Cl. .................................... 340/641; 340/458; 340/516; 307/10.8
[58] Field of Search ............... 340/458, 641, 514, 515, 340/516, 815.32; 307/10.8

[56] References Cited

U.S. PATENT DOCUMENTS

| | | | |
|---|---|---|---|
| 3,688,297 | 8/1972 | Barnum | 340/458 |
| 4,068,216 | 1/1978 | Brouwer et al. | 340/458 |
| 4,401,972 | 8/1983 | Lupoli | 340/458 |
| 4,668,946 | 5/1987 | Volk et al. | 340/458 |

Primary Examiner—Jin F. Ng
Assistant Examiner—Jill Jackson
Attorney, Agent, or Firm—Kelly, Bauersfeld & Lowry

[57] ABSTRACT

A system is provided for detecting the condition of a lamp, activating a permanent memory two-state display of the lamp condition, and displaying said condition during the daylight when no power is connected to the lamp. The system includes an electrical circuit powered by electricity drawn from power lines connected to the lamp such that the circuit is energized only when the lamp is supposed to be lighted. A rectifier transforms the alternating current of the power lines into a direct current for the circuit. The current of the power lines connected to the lamp is detected and measured when the lamp is supposed to be lighted in order to determine the condition of the lamp, and provide an appropriate signal for controlling switches within the circuit. Two alternative current pathways, each including a capacitor and a switch responsive to input from the current sensor, are provided in the circuit. When the circuit is energized, current flows through one pathway if the lamp is in working order, and through another if the lamp is sensed as being defective. The capacitor in the portion of the circuit being energized at any given time is periodically discharged to activate an electromagnet capable of changing the state of the display. Discharge of the capacitor is controlled by a free-run pulse generator which provides input to a third switch provided in the circuit.

33 Claims, 3 Drawing Sheets

SYSTEM FOR DETECTING THE CONDITION OF A LAMP AND ACTIVATING A PERMANENT MEMORY TWO-STATE DISPLAY OF THE LAMP CONDITION

BACKGROUND OF THE INVENTION

This invention relates generally to devices for sensing the condition of an electrical apparatus and providing an indicia of the sensed condition. More specifically, the present invention relates to a system for detecting the condition of a lamp and activating a permanent memory two-state display of the lamp condition.

Maintenance crews assigned the task of maintaining street lights in good working order have experienced difficulties in determining whether or not the lamp of the street light is in good working order. The problem is manifest in the fact that the maintenance crews are typically employed during daylight hours to maintain the street lights, when they are typically turned off.

Most street lights are controlled by a timer or a photoelectric cell so that the lamps are illuminated during twilight and nighttime hours, and turned off during the day time to conserve electrical power. Often maintenance crews have been forced to rely on reports from the general public that a particular street lamp is defective, which lamp is often difficult to locate by the maintenance crew after the report is filed. An alternative approach to maintaining street lights has been to periodically change all of the lamps during normal working hours, irrespective of the condition of any particular lamp. This approach, which has been adopted primarily in view of the absence of a reliable system for informing maintenance crews of lamp condition during day time hours, is inherently expensive since lamps are being replaced which are of good working order.

Accordingly, there has been a need for a system which is activated only when the lamp is supposed to be lighted, for detecting the condition of the lamp and activating a permanent memory two-state display of the lamp condition which can then be monitored by maintenance crews during day time hours. Such a system should be easily installed, energy efficient and highly reliable. Further, such a detection and display system is needed which is energized by the power lines connected to the lamp, and yet may be electrically isolated from those power lines if desired. Such a system would preferably transform alternating current of power lines into a direct current for powering the system, and permit accurate detection of the lamp condition. The present invention fulfills these needs and provides other related advantages.

SUMMARY OF THE INVENTION

The present invention resides in a novel system for detecting the condition of the lamp, which is activated only when the lamp is supposed to be lighted. The system comprises, generally, means for sensing the current of an electric power line connected to the lamp in order to determine whether the lamp is in a functional working condition or in a defective condition, and means for activating a display to selectively indicate the sensed lamp condition. Further, switch means responsive to electrical current detected by the sensing means, are provided for controlling the activating means.

In a preferred form of the invention, the activating means comprises a circuit energized with electricity drawn from the power lines connected to the lamp, such that the circuit is energized only when the lamp is supposed to be lighted. In this regard, an isolation transformer may be provided to separate the circuit from the power lines connected to the lamp. Means are coupled to output lines from the transformer for limiting the current available to the circuit, and a rectifier transforms the alternating current of the power lines into a direct current for the circuit.

The current through one of the power lines is sensed in order to determine the condition of the lamp. This current sensing is provided by a transformer whose primary winding is either one of the AC power lines of the lamp. Input from the current sensor is conditioned by a filter and fed to a current magnitude detector. The current magnitude detector provides an output signal which controls the current pathway through the circuit.

The primary circuit of the detection system includes alternative current pathways which each include a switch and a capacitor. Output from the current sensor, and more specifically the current magnitude detector, controls operation of these switches such that if the lamp is in a functional working condition, a first switch closes to permit current flow through a first pathway and charge a first capacitor, but if the lamp is in a defective condition, the output from the current magnitude detector opens the first switch and causes a second switch to close to permit current flow only through the second current pathway through the circuit. Means are provided for closing the second switch if the first switch is open, and opening the second switch if the first switch is closed.

In order to activate the permanent memory two-state display of the lamp condition, the capacitors are periodically discharged in order to energize an electromagnet which is capable of changing the state of the display. The circuit is arranged so that the alternate current pathways are capable of selectively energizing separate portions of the electromagnet in order to control the two-state display. In particular, a selected portion of the electromagnet is energized as it is periodically coupled to the energized current flow pathway.

To accomplish this, a free-run pulse generator is coupled to the circuit such that it is energized only when the lamp is supposed to be lighted. The pulse generator provides a pulsed input signal to a third switch which causes the charged capacitor to discharge through the electromagnet. Since only one of the capacitors is charged at any one time, depending upon the state of the switches controlling energization of the circuit, only one portion of the electromagnet will be energized during any given pulse.

In a second illustrated embodiment of the invention, the circuit may be energized through a direct connection to the power lines, without use of an isolation transformer. Further, current may be sensed directly from those power lines, also without a use of an isolation transformer.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
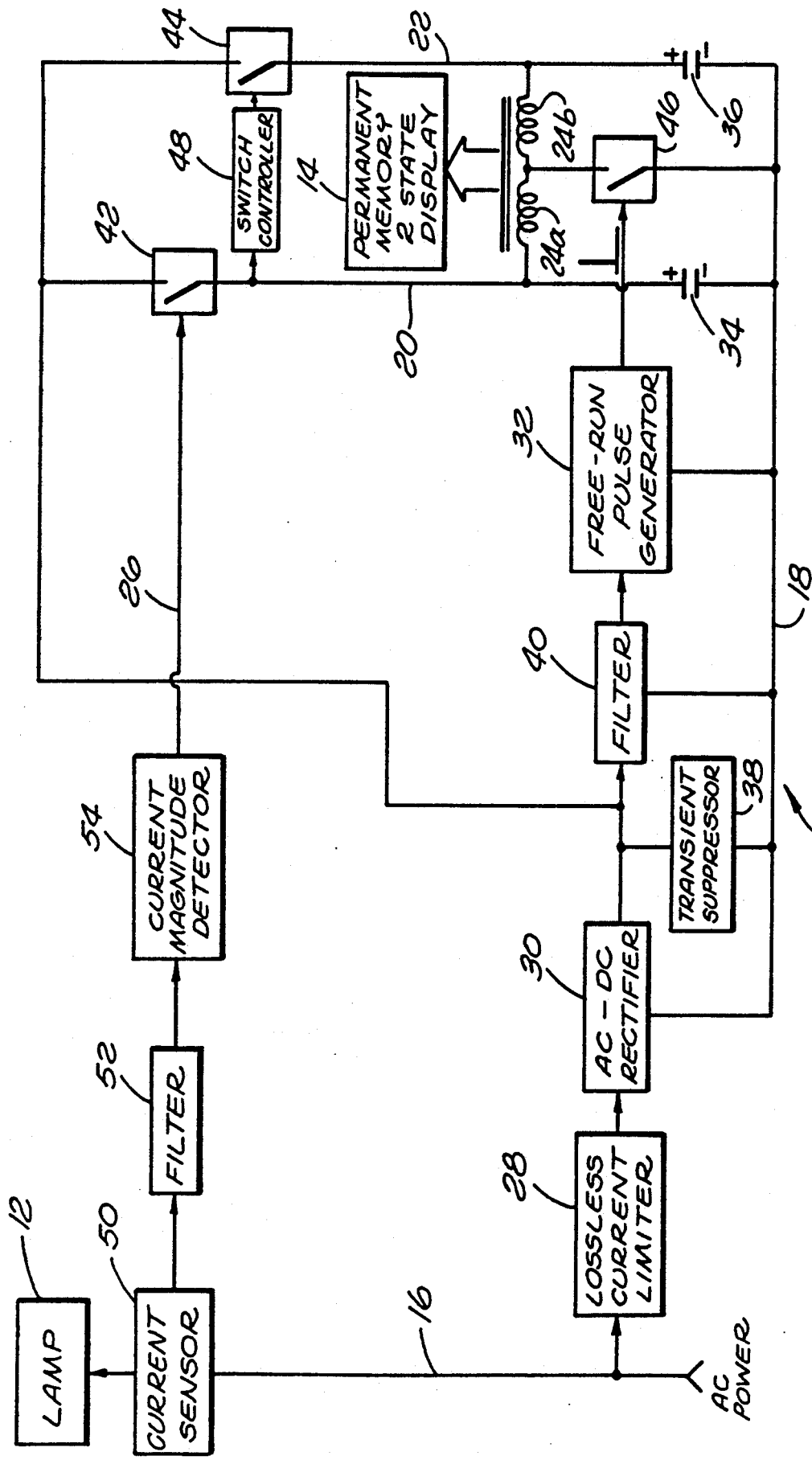
FIG. 1 is a schematic logic diagram of a lamp condition indication apparatus embodying the present invention, illustrating the general manner in which a primary circuit is powered by electricity drawn from power lines connected to the lamp such that the circuit is energized only when the lamp is supposed to be lighted, which circuit provides alternative current pathways controlled by switches, and further illustrating the manner in which a secondary circuit having a current sensor determines the condition of the lamp and provides input to the switches.

As shown in the drawings for purposes of illustration, the present invention is concerned with a lamp condition indication apparatus, generally designated in the accompanying drawings by the reference number 10. The apparatus 10 provides a system for detecting the condition of a lamp 12 and activating a permanent memory two-state display 14 of the lamp condition. The system senses the current of power lines 16 connected to the lamp 12 in order to determine the condition of the lamp, and is itself energized by those power lines 16.

In accordance with the present invention, and with reference to the logic diagram of FIG. 1, the lamp condition indication apparatus 10 includes a primary circuit 18 having two alternative current flow pathways 20 and 22, which is connected to the power lines 16 such that the circuit is energized only when the lamp is supposed to be lighted. The primary circuit 18 energizes an electromagnetic coil 24 which, in turn, controls the display 14 in order to provide an indicia of the condition of the lamp 12, whether or not the lamp is lighted. The apparatus 10 further includes a secondary circuit 26 which detects and measures the current in the power lines 16 to the lamp 12, and provides a controlling input signal to the primary circuit 18 to determine which alternative current flow pathway 20 or 22 is opened to current flow.

The primary circuit 18 draws AC power from a portion of the power lines 16 energized when the lamp 12 is intended to be lighted, through a lossless current limiter 28. The current limiter 28 preferably does not generate any heat, and limits the AC current delivered to an AC-DC rectifier 30. The output of the rectifier 30 is a pulsating DC current which is used to power a free-run pulse generator 32 and to charge one of two primary circuit capacitors 34 or 36, depending on whether the lamp 12 is in a good (current flowing) or bad (no current) condition. A transient suppressor 38 is provided to clip undesirable line voltage transients, should such occur in the circuit, and a filter 40 conditions electrical input to the pulse generator 32.

The primary circuit 18 includes three switches 42, 44 and 46 that control which of the alternative current flow pathways 20 or 22 is energized, and activation of the electromagnetic coil 24. The first switch 42 receives input through the secondary circuit 26 and closes to permit current flow through the first current flow pathway 20 when the lamp 12 is in a functional working condition. The second switch 44 is also coupled to the secondary circuit 26 through the first switch 42, and closes to permit current flow through the second current flow pathway 22 when the lamp is in a defective condition. A switch controller 48 opens the second switch 44 when the first switch 42 is closed, and closes the second switch when the first switch is opened. Thus, only one of the two pathways 20 and 22 is open to current flow at any given time, depending on the condition of the lamp 12. The third switch 46 is coupled to output from the pulse generator 32, and closes periodically to permit current flow through the electromagnetic coil 24 which, in turn, determines the state of the display 14.

The secondary circuit 26 includes a current sensor 50 which detects the current within the power lines 16 when the lamp is supposed to be lighted. Output from the current sensor is directed through a filter 52 to a current magnitude detector 54, which measures the sensed current. The current magnitude detector 54 is coupled to the first switch 42 and provides input to the switches 42 and 44, such that only one of the pathways 20 or 22 is opened to current flow at a given time, depending on the sensed condition of the lamp 12.

With the lamp current through the power lines 16 of proper magnitude, indicating that the lamp 12 is in a functional working condition, the first switch 42 is closed and the second switch 44 is opened so that current is permitted to flow through the first current flow pathway 20 only. In this configuration, pulsed current from the rectifier 30 charges the first primary circuit capacitor 34 and energizes the free-run pulse generator 32. Periodically the pulse generator 32 will closed the third switch 46. This permits the first primary circuit capacitor 34 to discharge and energize a portion of the electromagnetic coil 24 which, in turn, activates the permanent memory two-state display so that an indicia that the lamp is in a functional working condition, is shown. If, on the other hand, lamp current of proper magnitude is not sensed, the first switch 42 will open and the second switch 44 will close. When this occurs, current flow through the circuit follows the second pathway 22 rather than the first pathway 20, to charge the second primary circuit capacitor 36. As the pulse generator 32 closes periodically, the second primary capacitor 36 will discharge to energize a second portion of the electromagnetic coil 24. This changes the state of the display 14 to indicate that the lamp 12 is in a defective condition.

Figure 2:
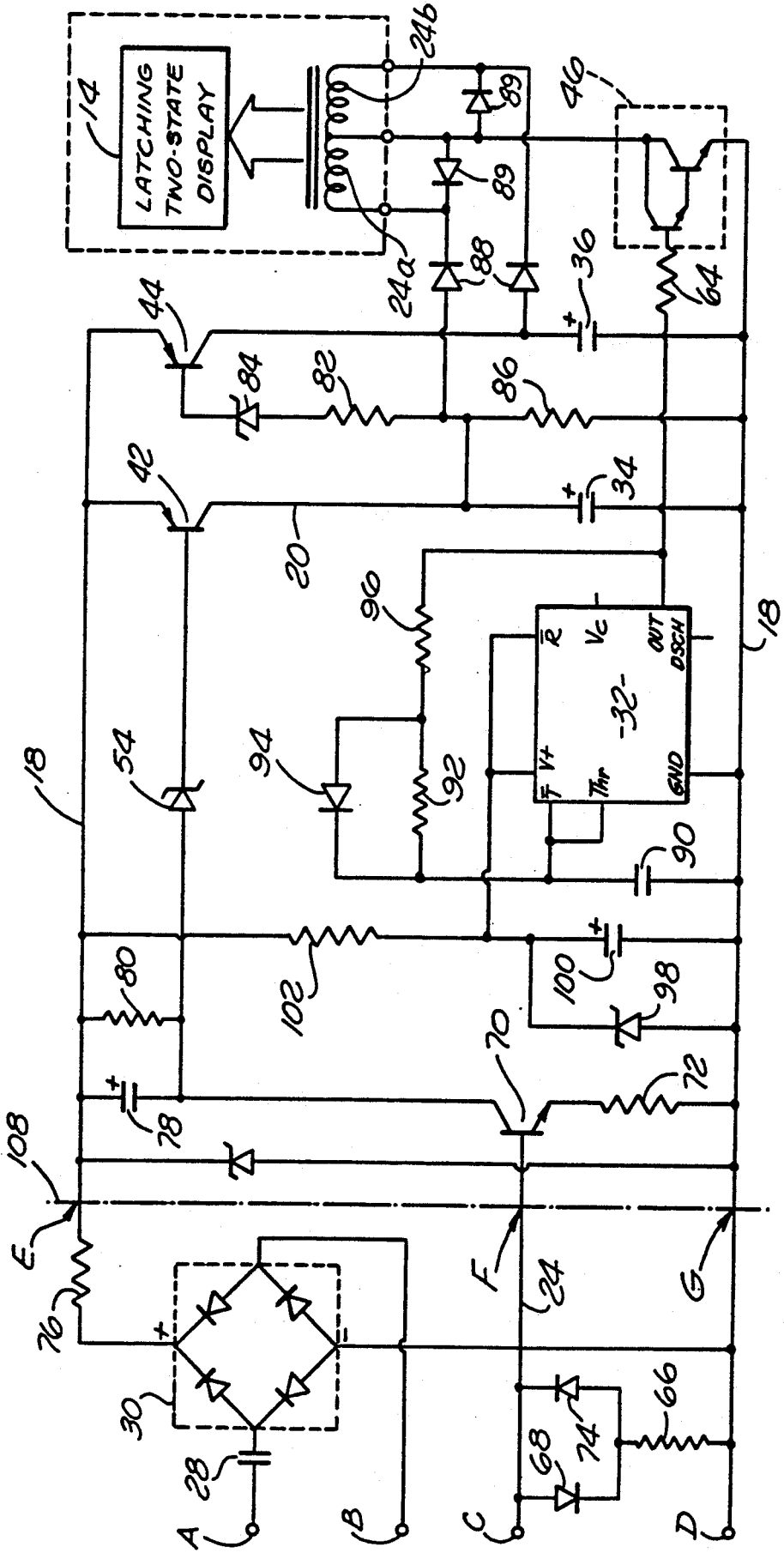
FIG. 2 is a circuit diagram illustrating one preferred embodiment of the major components of the apparatus illustrated in FIG. 1.
Figure 3:
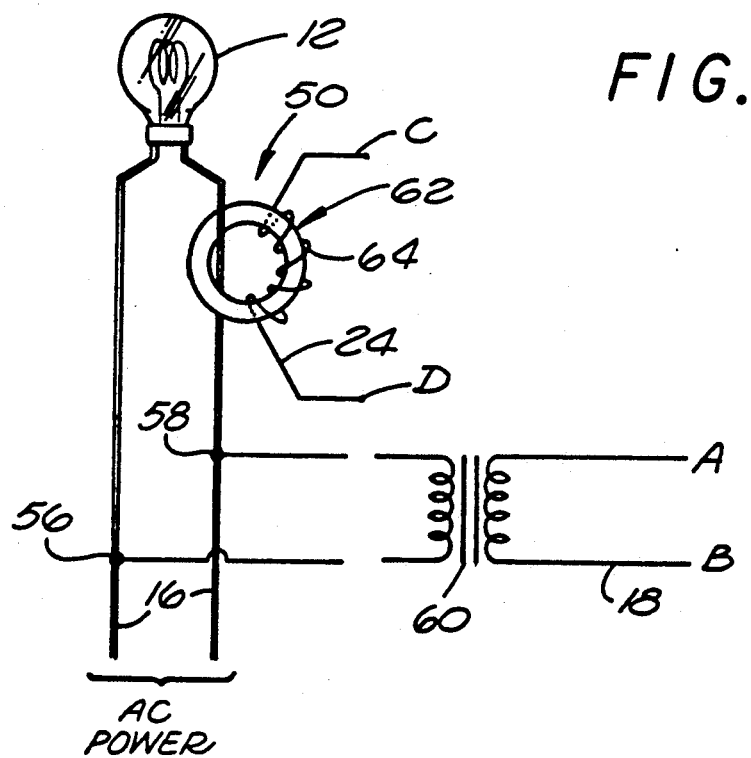
FIG. 3 is a schematic diagram illustrating the manner in which power is tapped from the AC power lines connected to the lamp, and the manner in which current is measured through those power lines, to provide connections for the circuit illustrated in FIG. 2.
Figure 4:
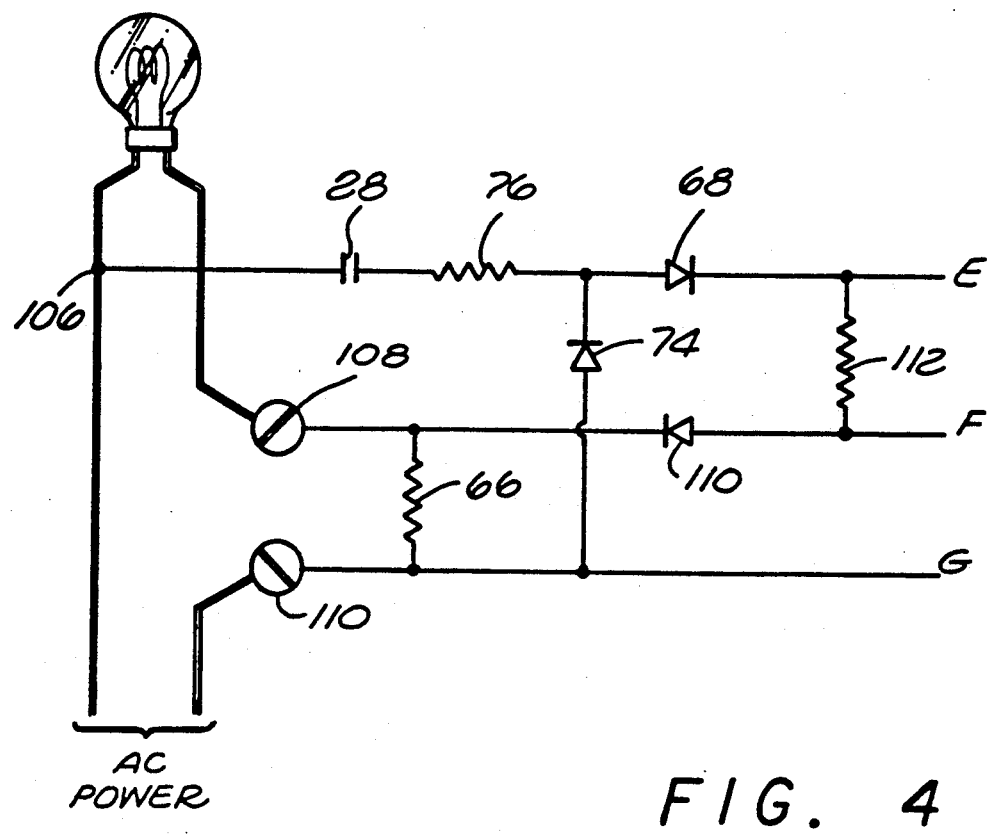
FIG. 4 is an alternate embodiment of connections to the AC power lines for energizing the circuit and measuring current flow through the power lines, which may be substituted for that illustrated in FIG. 3.

The lamp condition indication apparatus 10 described above will now be set forth with reference to exemplary circuits as illustrated in FIGS. 2 through 4. With specific reference initially to FIG. 3, power for the primary circuit 18 is drawn from the power lines 16 at junctions 56 and 58. The alternating current of the power lines 16 is isolated from the primary circuit 18 by means of an isolation transformer 60. Output from the isolation transformer 60 is labeled with the reference letters A and B, which connect to the circuit diagram of FIG. 2 at junctions labeled with those same reference letters, A and B.

With further reference to FIG. 3, the current sensor 50 comprises a current transformer 62 whose primary winding (1 turn) is either one of the AC power lines 16. Preferably, the secondary winding has 1000 turns, resulting in a current reduction ratio of 1000:1. The lines connected to each end of the secondary winding 64 form a portion of the secondary circuit 26 and are labeled, respectively, by the letters C and D. These two lines are coupled to the circuit illustrated in FIG. 2 at the junctions likewise labeled C and D.

The current generated through the secondary windings 64 generates a voltage across a resistor 66, whose value is selected in accordance with lamp current requirements. A diode 68 compensates for a base-emitter voltage drop of NPN transistor 70, including temperature tracking. The emitter current of the transistor 70 is thus defined by voltage drop across the resistor 66 divided by a resistor 72 (1000 ohms), and the transistor 70 acts as a constant current source. A diode 74 is used to equalize the volt-second area of the secondary winding 64 during the reverse half cycle of AC power within the AC power lines 16.

The lossless current limiter 28 comprises a capacitor interposed in line A between the isolation transformer 60 and the rectifier 30. The rectifier 30 is of the standard bridge rectifier type and produces a pulsating DC current which is used to power the pulse generator 32 and to charge one of the two primary circuit capacitors 34 (22 microfarads) and 36 (22 microfarads). The transient suppressor 38 (33 volts) comprises a zener diode which clips undesirable line voltage transients, and a resistor 76 (1000 ohms) serves as a transient current limiter.

When the current in the power lines 16 is of proper magnitude to indicate that the lamp 12 is in proper working order, the pulsed current of the transistor 70 charges a capacitor 78, while a resistor 80 (100,000 ohms) discharges it. The switches 42 and 44 are each transistors. In order for the first transistor switch 42 (MPS 6172) to turn on or close in order to permit current flow through the first pathway 20, the average current of the transistor 70 must generate a voltage across the capacitor 78 that is greater than the voltage drop across a zener diode 54 (2.4 volts) (which functions as the current magnitude detector) plus emitter-base voltage drop of the transistor 42. With the transistor switch 42 switched on, or closed, the transistor 44 is switched off or opened by means of the switch controller 48 including a resistor 82 (220,000 ohms) and a zener diode 84 (10 volts). In this case, only the first primary circuit capacitor 34 becomes slowly charged, within about 0.5 seconds.

If no lamp current is sensed by the current sensor 50, or if the connection to the lamp 12 is periodically intermittent, then the current from the transistor 70 cannot overcome the discharge rate of the capacitor 78 by the resistor 80, and the capacitor 78 voltage cannot be high enough to turn on the first switch transistor 42. With the first switch transistor 42 off, the second switch transistor 44 (MPS 6172) turns on, slowly charging the second primary circuit capacitor 36. Although the first primary circuit capacitor 34 will then have a very small charge, this is of no consequence to operation of the apparatus 10.

The state of the display 14 depends on which of the primary capacitors 34 and 36 are being discharged by a third switch transistor 46, with said state remaining unchanged when AC power is off. The configuration of the primary circuit 18, including a resistor 86 (47,000 ohms) and four diodes 88 (IN 4000) and 89 controlling current flow through the electromagnetic coil 24, results in high coil current necessary to change the state of the display 14 when the third switch transistor 46 is turned on, yet a very low coil power if the discharge pulse rate from the pulse generator 32 is low.

The free-running low-power pulse generator 32 (TLC555, ICM7555) has a relatively long off time (output low) and only a few milliseconds of on time (output high). The pulse generator preferably activates the display about twice per second for a maximum time per pulse of ten milliseconds. With the output low, a capacitor 90 (0.1 microfarads) is discharged slowly, due to the high value of a resistor 92 (10M ohms). When the voltage across the capacitor 90 drops to about one third of V+, the T input of the pulse generator 32 switches its output to high. The capacitor 90 is then charged to a positive value much faster, due to a diode 94 and the low value of a resistor 96 (15,000 ohms), until its voltage reaches two thirds of V+ (threshold input), at which time the output of the pulse generator is switched to low. This results in the pulse generator 32 generating short pulses, sampling the lamp condition. Input to the pulse generator 32 is conditioned by the filter 40, including a zener diode 98 (1-5 volts), a capacitor 100 (22 microfarads) and a resistor 102 (22,000 ohms). A resistor 104 (10,000 ohms) is placed between the output of the pulse generator 32 and the Darlington transistor third switch 46.

FIG. 4 illustrates an alternative embodiment for drawing power from the AC power lines 16 to energize the primary circuit 18, and sensing the current of those power lines through the secondary circuit 26. In this alternative embodiment, one of the power lines 16 is tapped at a junction 106 to energize a line E. The other power line 16 to the lamp 12 is broken and connected to two separate lines, F and G at nodes 108 and 110. The lines E, F and G would tie into the circuit illustrated in FIG. 2 along the dotted line 108 at those points indicated with the same letters. This alternative connection of the circuits 18 and 26 to the power lines 16 would be utilized if isolation transformers were not needed. The lossless current limiter capacitor 28, the resistors 66 and 76 and diodes 68 and 74 all perform the same function as explained above. In addition, a diode 110 and a resistor 112 are provided.

It should be understood that the values of the circuit components identified above are exemplary only. Further, the value of the resistor 66 is selected for the minimum specified current when the lamp is in good working order. The capacitor 28 preferably has a value of 0.1 microfarads for power lines having 110 volt AC current, and 0.056 microfarads for power lines having 220 volts AC. The capacitor 78 is selected for a specified intermittent-sense time constant, and the resistor 96 defines the specified solenoid switch off-state time constant.

From the foregoing it is to be appreciated that the lamp condition indication apparatus 10 of the present invention is capable of providing a permanent indication of whether a street light is good or bad, in order to help maintenance crews working during the day time. This is achieved by activating a high-visibility display device with memory, to be mounted next to the street light, with indicia of the lamp condition independent of AC power. The apparatus 10 is energized and activated only when the lamp 12 is supposed to be lighted, and it may be easily installed, is energy efficient and highly reliable. The display 14 may simply comprise a visible panel having one side arranged to indicate that the lamp is in a functional working condition, and the other side arranged to indicate that the lamp is defective. The electromagnetic coil 24 would simply turn the panel to expose one side or the other. This provides an indicia of lamp condition during daylight hours, when the lamp is normally not lighted. Further, the apparatus 10 of the present invention provides a DC circuit which may be isolated from the power lines 16 by an isolation transformer 68, if desired.

Although two particular embodiments of the invention have been described in detail for purposes of illustration, various modifications of each may be made without departing from the spirit and scope of the invention. Accordingly, the invention is not to be limited, except as by the appended claims.

I claim:

1. A system for detecting the condition of a lamp and activating a permanent memory two-state display of the lamp condition, the system comprising:
   circuit means powered by electricity drawn from power lines connected to the lamp such that the circuit means is energized only when the lamp is supposed to be lighted, the circuit means including a first current flow pathway and a second current flow pathway;
   means for sensing the current of the electric power lines connected to the lamp;
   first switch means forming a portion of the circuit means and responsive to electric current detected by the sensing means, for selectively directing power through the first current flow pathway if the lamp is in the functional working condition, or through the second current flow pathway if the lamp is in the defective condition; and
   second switch means for intermittently activating the display to indicate that the lamp is in the functional working condition if power is directed through the first current flow pathway or to indicate that the lamp is in the defective condition if power is directed through the second current flow pathway, the second switch means including electromagnet means selectively energized by the first or second current flow pathways, for activating the display.

2. A system as set forth in claim 1, wherein the first switch means includes a first switch in the first current flow pathway coupled to the sensing means, which first switch closes to permit current flow through the first current flow pathway when the lamp is in the functional working condition, a second switch in the second current flow pathway which closes to permit current flow through the second current flow pathway when the lamp is in the defective condition, and a control switch which closes the second switch when the first switch is open, and opens the second switch when the first switch is closed.

3. A system as set forth in claim 1, including an isolation transformer between the power lines connected to the lamp, and the circuit means.

4. A system as set forth in claim 1, wherein the first current flow pathway includes first capacitor means for storing a charge when the lamp is in the functional working condition, which first capacitor means is discharged by the second switch means to activate the display.

5. A system as set forth in claim 4, wherein the second current flow pathway includes second capacitor means for storing a charge when the lamp is in the defective condition, which second capacitor means is discharged by the second switch means to activate the display.

6. A system as set forth in claim 1, wherein the circuit means includes rectifier means for transforming an alternating current of the power lines to a direct current in the circuit means.

7. A system as set forth in claim 6, including means coupled to the rectifier means, for limiting current from the power lines.

8. A system as set forth in claim 1, wherein the sensing means includes a current sensor coupled to a power line of the lamp, a filter coupled to the current sensor, and a current magnitude detector coupled to both the filter and the first switch means.

9. A system as set forth in claim 8, wherein the current sensor includes a transformer whose primary winding is either one of the power lines of the lamp.

10. A system as set forth in claim 1, wherein the second switch means includes a free-run pulse generator which cyclically activates and de-activates the display, wherein the pulse generator is coupled to the circuit means such that the pulse generator is energized only when the lamp is supposed to be lighted.

11. A system as set forth in claim 10, wherein the pulse generator activates the display about twice per second for a maximum time per pulse of ten milliseconds.

12. A system as set forth in claim 10, wherein the circuit means includes a transient suppressor for clipping undesirable circuit voltage transients, and a filter coupled to and providing input for the pulse generator.

13. A system for detecting the condition of a lamp, comprising:
   means for sensing the current of an electric power line connected to the lamp;
   means for activating a permanent memory two-state display to selectively indicate, irrespective of whether or not power is removed from the lamp, if the lamp is functional or, alternatively, if the lamp is defective, the activating means including an electrical circuit powered by electricity drawn from power lines connected to the lamp such that the circuit is energized only when the lamp is supposed to be lighted, the circuit including a first current pathway, an alternative second current pathway, rectifier means for transforming alternating current of the power lines to direct current in the circuit, and means coupled to the rectifier means for limiting current from the power lines;
   means for energizing the activating means with electricity drawn from the power lines connected to the lamp such that the activating means is energized only when the lamp is supposed to be lighted; and
   switch means responsive to electrical current detected by the sensing means, for controlling the activating means such that the display indicates whether the lamp is functional or defective.

14. A system as set forth in claim 13, including an isolation tranformer between the power lines connected to the lamp, and the rectifier means.

15. A system as set forth in claim 13, wherein the switch means includes a first switch in the first current pathway coupled to the sensing means, which closes to permit current flow through the first current pathway when the lamp is functional, a second switch in the second current pathway which closes to permit current flow through the second current pathway when the lamp is defective, and means for closing the second switch when the first switch is open, and opening the second switch when the first switch is closed.

16. A system as set forth in claim 15, wherein the sensing means includes a current sensor coupled to the power line of the lamp, and a current magnitude detector coupled to both the current sensor and the first switch.

17. A system as set forth in claim 15, wherein the activating means includes a free-run pulse generator, wherein the pulse generator is coupled to both the first and second current pathways such that the pulse generator is energized only when the lamp is supposed to be lighted.

18. A system as set forth in claim 17, wherein the first current pathway includes a first capacitor for storing a charge when the lamp is functional, the second current pathway includes a second capacitor for storing a charge when the lamp is defective, and wherein the switch means includes a third switch coupled to the pulse generator, which intermittently discharges either the first or the second capacitor to define the state of the display.

19. A system as set forth in claim 18, wherein the activating means includes an electromagnet selectively energized by the circuit as the third switch discharges the capacitors to define the state of display.

20. A system for detecting the condition of a lamp and activating a permanent memory two-state visual display of the lamp condition, the system comprising:
    rectifier means for transforming alternating current of power lines connected to the lamp, to a direct current;
    an electrical circuit coupled to the rectifier means and powered by electricity drawn from the power lines connected to the lamp such that the circuit is energized only when the lamp is supposed to be lighted, the circuit including a first current pathway having a first capacitor for storing a charge, and a second current pathway having a second capacitor for storing a charge;
    means for sensing the current of the power lines connected to the lamp;
    a first switch in the first current pathway and coupled to the sensing means, which first switch closes to permit current flow through the first current pathway when the lamp is in a functional working condition;
    a second switch in the second current pathway which closes to permit current flow through the second current pathway when the lamp is in a defective condition;
    a control switch which closes the second switch when the first switch is opened, and opens the second switch when the first switch is closed;
    a free-run pulse generator for defining the state of the display, wherein the pulse coupled to the circuit such that the pulse generator is energized only when the lamp is supposed to be lighted; and
    a third switch responsive to the signal of the pulse generator, which third switch discharges the first and second capacitors to activate the permanent memory display.

21. A system as set forth in claim 20, wherein the third switch includes electromagnet means selectively energized as the first or second capacitors are discharged, for activating the display.

22. A system as set forth in claim 20, including an isolation transformer between the power lines connected to the lamp, and the circuit, and means coupled to the rectifier means for limiting current from the power lines.

23. A system for detecting the condition of a lamp and activating a permanent memory two-state display of the lamp condition, the system comprising:
    circuit means powered by electricity drawn from power lines connected to the lamp such that the circuit means is energized only when the lamp is supposed to be lighted, the circuit means including a first current flow pathway and a second current flow pathway;
    means for sensing the current of the electric power lines connected to the lamp;
    first switch means forming a portion of the circuit means and responsive to electric current detected by the sensing means, for selectively directing power through the first current flow pathway if the lamp is in the functional working condition, or through the second current flow pathway if the lamp is in the defective condition; and
    second switch means for intermittently activating the display to indicate that the lamp is in the functional working condition if power is directed through the first current flow pathway or to indicate that the lamp is in the defective condition if power is directed through the second current flow pathway;
    wherein the first current flow pathway includes first capacitor means for storing a charge when the lamp is in the functional working condition, which first capacitor means is discharged by the second switch means to activate the display.

24. A system as set forth in claim 23, wherein the second current flow pathway includes second capacitor means for storing a charge when the lamp is in the defective condition, which second capacitor means is discharged by the second switch means to activate the display.

25. A system for detecting the condition of a lamp and activating a permanent memory two-state display of the lamp condition, the system comprising:
    circuit means powered by electricity drawn from power lines connected to the lamp such that the circuit means is energized only when the lamp is supposed to be lighted, the circuit means including a first current flow pathway and a second current flow pathway;
    means for sensing the current of the electric power lines connected to the lamp;
    first switch means forming a portion of the circuit means and responsive to electric current detected by the sensing means, for selectively directing power through the first current flow pathway if the lamp is in the functional working condition, or through the second current flow pathway if the lamp is in the defective condition; and
    second switch means for intermittently activating the display to indicate that the lamp is in the functional working condition if power is directed through the first current flow pathway or to indicate that the lamp is in the defective condition if power is directed through the second current flow pathway, the second switch means including a free-run pulse generator which cyclically activates and de-activates the display, wherein the pulse generator is coupled to the circuit means such that the pulse generator is energized only when the lamp is supposed to be lighted.

26. A system as set forth in claim 25, wherein the pulse generator activates the display about twice per second for a maximum time per pulse of ten milliseconds.

27. A system as set forth in claim 26, wherein the circuit means includes a transient suppressor for clipping undesirable circuit voltage transients, and a filter coupled to and providing input for the pulse generator.

28. A system for detecting the condition of a lamp and activating a permanent memory two-state display of the lamp condition, the system comprising:
   circuit means powered by electricity drawn from power lines connected to the lamp such that the circuit means is energized only when the lamp is supposed to be lighted, the circuit means including a first current flow pathway and a second current flow pathway;
   means for sensing the current of the electric power lines connected to the lamp;
   first switch means forming a portion of the circuit means and responsive to electric current detected by the sensing means, for selectively directing power through the first current flow pathway if the lamp is in the functional working condition, or through the second current flow pathway if the lamp is in the defective condition; and
   second switch means for intermittently activating the display to indicate that the lamp is in the functional working condition if power is directed through the first current flow pathway or to indicate that the lamp is in the defective condition if power is directed through the second current flow pathway, wherein the circuit means includes rectifier means for transforming an alternating current of the power lines to a direct current in the circuit means.

29. A system as set forth in claim 28, including means coupled to the rectifier means, for limiting current from the power lines.

30. A system for detecting the condition of a lamp and activating a permanent memory two-state display of the lamp condition, the system comprising:
   circuit means powered by electricity drawn from power lines connected to the lamp such that the circuit means is energized only when the lamp is supposed to be lighted, the circuit means including a first current flow pathway and a second current flow pathway;
   means for sensing the current of the electric power lines connected to the lamp;
   first switch means forming a portion of the circuit means and responsive to electric current detected by the sensing means, for selectively directing power through the first current flow pathway if the lamp is in the functional working condition, or through the second current flow pathway if the lamp is in the defective condition, the first switch means including a first switch in the first current flow pathway coupled to the sensing means, which first switch closes to permit current flow through the first current flow pathway when the lamp is in the functional working condition, a second switch in the second current flow pathway which closes to permit current flow through the second current flow pathway when the lamp is in the defective condition, and a control switch which closes the second switch when the first switch is open, and opens the second switch when the first switch is closed; and
   second switch means for intermittently activating the display to indicate that the lamp is in the functional working condition if power is directed through the first current flow pathway or to indicate that the lamp is in the defective condition if power is directed through the second current flow pathway.

31. A system for detecting the condition of a lamp, comprising:
   means for sensing the current of an electric power lamp, comprising:
   means for sensing the current of an electric power line connected to the lamp;
   means for activating a permanent memory two-state display to selectively indicate, irrespective of whether or not power is removed from the lamp, if the lamp is functional or, alternatively, if the lamp is defective, the activating means including an electrical circuit powered by electricity drawn from power lines connected to the lamp such that the circuit is energized only when the lamp is supposed to be lighted, wherein the circuit includes a first current pathway and an alternative second current pathway, and a free-run pulse generator, wherein the pulse generator is coupled to both the first and second current pathways such that the pulse generator is energized only when the lamp is supposed to be lighted;
   means for energizing the activating means with electricity drawn from power lines connected to the lamp such that the activating means is energized only when the lamp is supposed to be lighted; and
   switch means responsive to electrical current detected by the sensing means, for controlling the activating means, such that the display indicates whether the lamp is functional or defective, the switch means including a first switch in the first current pathway coupled to the sensing means, which closes to permit current flow through the first current pathway when the lamp is functional, a second switch in the second current pathway which closes to permit current flow through the second current pathway when the lamp is defective, and means for closing the second switch when the first switch is open, and opening the second switch when the first switch is closed.

32. A system as set forth in claim 31, wherein the first current pathway includes a first capacitor for storing a charge when the lamp is functional, the second current pathway includes a second capacitor for storing a charge when the lamp is defective, and wherein the switch means includes a third switch coupled to the pulse generator, which intermittently discharges either the first or the second capacitor to define the state of the display.

33. A system as set forth in claim 32, wherein the activating means includes an electromagnet selectively energized by the circuit as the third switch discharge the capacitors to define the state of display.

* * * * *

UNITED STATES PATENT AND TRADEMARK OFFICE
CERTIFICATE OF CORRECTION

PATENT NO. : 5,075,672

DATED : December 24, 1991

INVENTOR(S) : Boris Stefanov

It is certified that error appears in the above-identified patent and that said Letters Patent is hereby corrected as shown below:

In column 6, line 23, delete "1-5" and insert therefor --15--.

In column 9, lines 57 and 58, delete "for defining the state of the display, wherein the pulse".

In column 12, line 63, delete "discharge" and insert therefor --discharges--.

Signed and Sealed this

Twenty-third Day of March, 1993

Attest:

STEPHEN G. KUNIN

*Attesting Officer*    Acting Commissioner of Patents and Trademarks